United States Patent [19]

Ryckman, Jr.

[11] Patent Number: 4,538,049
[45] Date of Patent: Aug. 27, 1985

[54] TOASTER OVEN

[75] Inventor: William D. Ryckman, Jr., Orange, Conn.

[73] Assignee: Black & Decker, Inc., Newark, Del.

[21] Appl. No.: 596,382

[22] Filed: Apr. 3, 1984

[51] Int. Cl.³ .............................. H05B 1/02; F24C 7/10
[52] U.S. Cl. .................................... 219/386; 219/395; 219/397; 219/484
[58] Field of Search ............... 219/386, 395, 397, 398, 219/414, 484, 483

[56] References Cited

U.S. PATENT DOCUMENTS

| 729,771 | 6/1903 | Johnston | 219/484 |
|---|---|---|---|
| 1,406,372 | 2/1922 | Grapp | 219/395 |
| 1,612,065 | 12/1926 | Serrell | 219/398 |
| 1,685,647 | 9/1928 | Shroyer | 219/413 |
| 1,721,582 | 7/1929 | Ziola | 219/414 |
| 2,257,159 | 9/1941 | Crites . | |
| 2,266,957 | 12/1941 | Chenoweth | 219/395 |
| 2,557,832 | 6/1951 | McCormick . | |
| 2,778,914 | 1/1957 | Vallorani | 219/398 |
| 3,257,544 | 6/1966 | Benjamin | 219/398 |
| 4,238,670 | 12/1980 | Maitenaz | 219/398 |
| 4,302,661 | 11/1981 | Perry, Jr. | 219/414 |

Primary Examiner—Roy N. Envall, Jr.
Assistant Examiner—Teresa J. Walberg
Attorney, Agent, or Firm—Leonard J. Platt

[57] ABSTRACT

A new and improved electric toaster oven is disclosed, wherein the heating ratio between upper and lower heat sources can be readily changed to suit the different requirements of the food item being cooked, while the rate at which the total heat is applied to the food item remains substantially constant throughout.

7 Claims, 2 Drawing Figures

TOASTER OVEN

The present invention relates in general to new and improved apparatus for varying the ratio of heat applied to an object by first and second heat sources positioned on opposite sides of such object and more specifically to new and improved toaster ovens wherein the ratio of the heat applied to a food item by heating elements positioned above and below the food item can be varied to suit different requirements.

BACKGROUND OF THE INVENTION

1. Field of the Invention

An electric toaster oven is conventionally used to prepare a number of different food items by the application of heat. Since different food items may respond in different ways to the application of heat from an upper and a lower heat source, adjustments must sometimes be made to assure that all portions of the food item are properly heated in the toaster oven. For example, while most portions of a cake may be baking at the proper rate for a particular heat setting, the crust may become scorched unless special precautions are taken. Conversely, for a properly browned crust, the remainder of the cake may be receiving insufficient heat to bake properly throughout.

In many existing toaster ovens the shelf which supports the food item while it is exposed to heat, usually a wire grate or grill or the like, is adjustable to vary the distance between the food item and the upper and lower heat sources. Although this arrangement affords some flexibility, it is not useful where a change must be made during the cooking process. Thus, it is rarely convenient, while the food item is baking or broiling etc., to open the oven and to physically lower or raise the hot shelf while the food item is supported on it, since this requires withdrawing the shelf from the oven and reinserting it on a higher or lower set of supports. However, a change in the manner in which heat is applied is sometimes required during the cooking process, e.g. during the final phase of baking a cake when the rate at which heat is applied may have to be reduced in order to obtain a cake crust of the desired color.

In essence, the repositioning of the food item relative to the upper and lower heat sources changes the heating ratio, i.e. the rate at which heat is applied by the upper heat source relative to that applied by the lower heat source, while the rate of total heat applied by both sources remains constant. The total heat applied can, of course, be changed by the temperature setting, which is a conventional feature of most existing toaster ovens.

2. Description of the Prior Art

It is already known in the art to vary the heating ratio between the upper and lower sources of an oven by electrical means in order to meet the requirements of the particular food item being baked, e.g. as shown by U.S. Pat. No. 1,685,647 to Shroyer. Further, as shown both by Shroyer and U.S. Pat. No. 4,302,661 to Perry, each heat source may consist of multiple heating elements, the interconnection of which may itself be varied to obtain different effects, e.g. broiling, baking or self-cleaning in Perry, or to provide slow, intermediate or high heat in Shroyer. However, existing prior art equipment fails to provide such an arrangement wherein the rate of total heat applied to the food item remains constant. As a consequence, other factors will vary as the interconnection of the heating elements is changed, e.g. the degree to which the food item is cooked in a given time interval, or the length of the time interval required for the food item to reach the desire condition.

A known technique by which the ratio of heat applied by the upper heat source relative to the lower heat source is varied in existing toaster ovens provides a diode rectifier which is selectively connected in series with the upper heating elements when the heat applied by the latter is to be reduced. A disadvantage of the technique is that a relatively large net DC current is drawn, on the order of 4 amperes or higher, which can cause saturation in the secondary winding of the power transformer. Where this occurs, an unbalanced power source results.

Another known technique for varying the heating ratio involves replacing the upper and lower heating elements, or any one of them, with heating elements having a different electrical resistance. Since this requires disconnecting and reconnecting one or more heating elements, the technique is considered impractical for the average person, for being too difficult to carry out.

Still a further technique involves the use of a rheostat or of a variable transformer connected to the upper heating elements to vary the magnitude of the current in the latter. When so connected, some of the power normally dissipated in the heating elements is then dissipated in the rheostat, which must be relatively large to handle the current. This mandates an increase in the size as well as in the cost of the toaster oven and is therefore undesirable.

OBJECTS OF THE INVENTION

It is a primary object of the present invention to provide a new and improved toaster oven which is not subject to the foregoing disadvantages.

It is a further object of the present invention to provide new and improved apparatus for varying the ratio of heat applied to an object by at least first and second heat sources positioned on opposite sides of such object while the rate at which the total heat is applied remains substantially constant.

It is another object of the present invention to provide a new and improved toaster oven wherein the ratio of heat applied to a food item in the oven can be varied simply and conveniently on the part of the user without substantially changing the rate of total heat applied.

It is an additional object of the present invention to provide a new and improved toaster oven which can be economically implemented, wherein the total amount of heat applied to a food item remains substantially constant, but which allows the heating ratio to be varied.

SUMMARY OF THE INVENTION

Although the present invention is applicable to any arrangement in which the ratio of heat applied to an object positioned between at least two sources of heat can be varied while applying constant total heat, the improvement herein is specifically directed to a toaster oven. The toaster oven includes a chamber wherein an upper heat source comprises a pair of heating elements located in the upper chamber portion and a lower heat source having a pair of heating elements located in the lower chamber portion. The electrical resistance of the upper heating elements is the same and each is lower than that of the respective lower heating elements. The latter are likewise equal in resistance.

During the normal mode of operation when optimum power is needed, e.g. for baking a cake where top browning for the moment is not a major concern, the heating ratio established in the chamber provides a higher heat output from the upper heating elements than from the lower heating elements. As used herein, the term heating ratio defines the ratio of the wattage of the upper-to-lower heat source, i.e. the ratio of rate at which heat is applied to the food item by the upper heat source with respect to the rate at which heat is applied by the lower heat source. In accordance with the present invention, the aforesaid heating ratio can be selectively changed by setting a switch to a different position. The second heating ratio is lower than the first and browning of the top crust proceeds at a slower rate. The rate at which total heat is applied by the two heat sources remains substantially the same for the two heating ratios, and can be adjusted by a conventional temperature setting.

These and other objects of the present invention, together with further features and advantages thereof will become clear from the following detailed specification when read in conjunction with the accompanying drawings in which applicable reference numerals have been carried forward.

DESCRIPTION OF THE INVENTION

Figure 1:
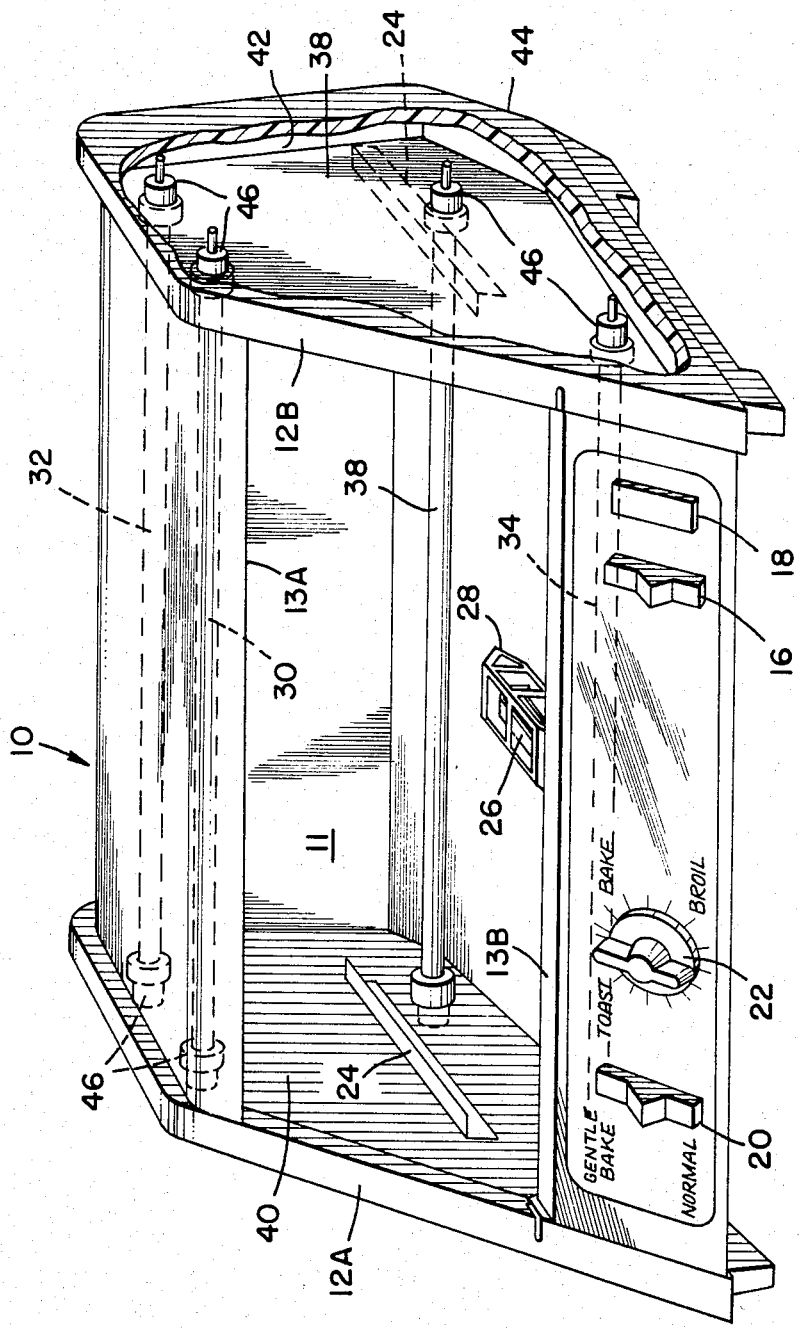
FIG. 1 is a front perspective of an electric toaster oven in accordance with the present invention.

Referring now to the drawings, FIG. 1 shows an electric toaster oven comprising an interior chamber 11. Chamber 11 includes an opening defined by frame members 12A, 12B, 13A and 13B through which the interior of the oven in serviced. A glass door, which is adapted to cover the chamber opening, has been omitted from the drawing for the sake of clarity of illustration. A main switch 16, which is adapted to turn the toaster oven on or off, works in conjunction with an indicator light 18. The indicator light tells the switch position by whether it is on or off. A second switch 20 is adapted to switch the oven from its normal mode of operation to a "Gentle Bake" mode, as explained below. A rotary control 22 can be set to various positions away from its 12 o'clock position to establish the desired temperature in the chamber. A pair of supporting rails 24 is riveted to the inside walls of chamber 11 at the same height. A shelf (not shown), which may consist of a wire grill or grate or the like, is adapted to be removably positioned on rails 24. The food item to be cooked will either rest directly on the shelf, e.g. bread for toasting, or in a pan or other vessel such as may be used for cake or the like.

A thermostat 26 is located inside chamber 11 and operates to keep the temperature in the chamber at the level selected by the setting of rotary control 22. The thermostat may comprise a conventional bimetallic strip which opens or closes the heating current supply circuit in accordance with the selected temperature setting. A protective cage 28 surrounds the thermostat and protects it from damage.

In the illustrated embodiment of the invention the upper heat source of chamber 11 comprises first and second heating elements 30 and 32 respectively, both located in the upper portion of the chamber and sometimes referred to herein as the upper heating elements.

Chamber 11 further includes a lower heat source comprising third and fourth heating elements 34 and 36 respectively, both located in the lower portion of the chamber and occasionally referred to herein as the lower heating elements. The upper and lower heat sources 30, 32 and 34, 36 respectively, are positioned above and below respectively, rails 24 and hence above and below respectively, the food item which rests on the shelf that is supported on the rails.

As shown, heating elements 34 and 36 are positioned closer to rails 24 than heating elements 30 and 32. The thickness of the food being heated or cooked will determine the spacing to the upper heating elements 30 and 32. Also, the upper element will supply heat almost entirely by radiation whereas the lower elements will supply heat by both radiation and convection. The result of this is that the ratio of upper element watts to lower element watts which produces even toasting of bread on both sides often results in excessive browning of the top of a cake.

The opposite ends of each heating element pass through interior sidewalls 38 and 40 into a pair of side compartments. In FIG. 1, the toaster oven is shown partially broken away to illustrate one such compartment 42. Suitable wire connections (not shown) couple the ends of the heating elements to the switches on the front panel of the toaster oven. These wire connections are disposed within the aforesaid compartments. The heating elements are mounted to sidewalls 38 and 40 by means of non-conductive ceramic holders 46, which act to insulate them from the metallic sidewalls. Each heating element comprises an electrical resistance element which radiates heat in proportion to the magnitude of the electric current passing through it. Such metallic sheath heating elements are commercially available, e.g. under the name Calrod.

In the embodiment of the invention under discussion, the electrical resistance is substantially the same for elements 30 and 32, each being 8 ohms in a preferred embodiment. Similarly, elements 34 and 36 have substantially the same electrical resistance, each being 12 ohms in the preferred embodiment. The lower heating elements are chosen to have individually greater electrical resistance than respective upper heating elements for reasons that will become apparent hereinbelow.

Figure 2:
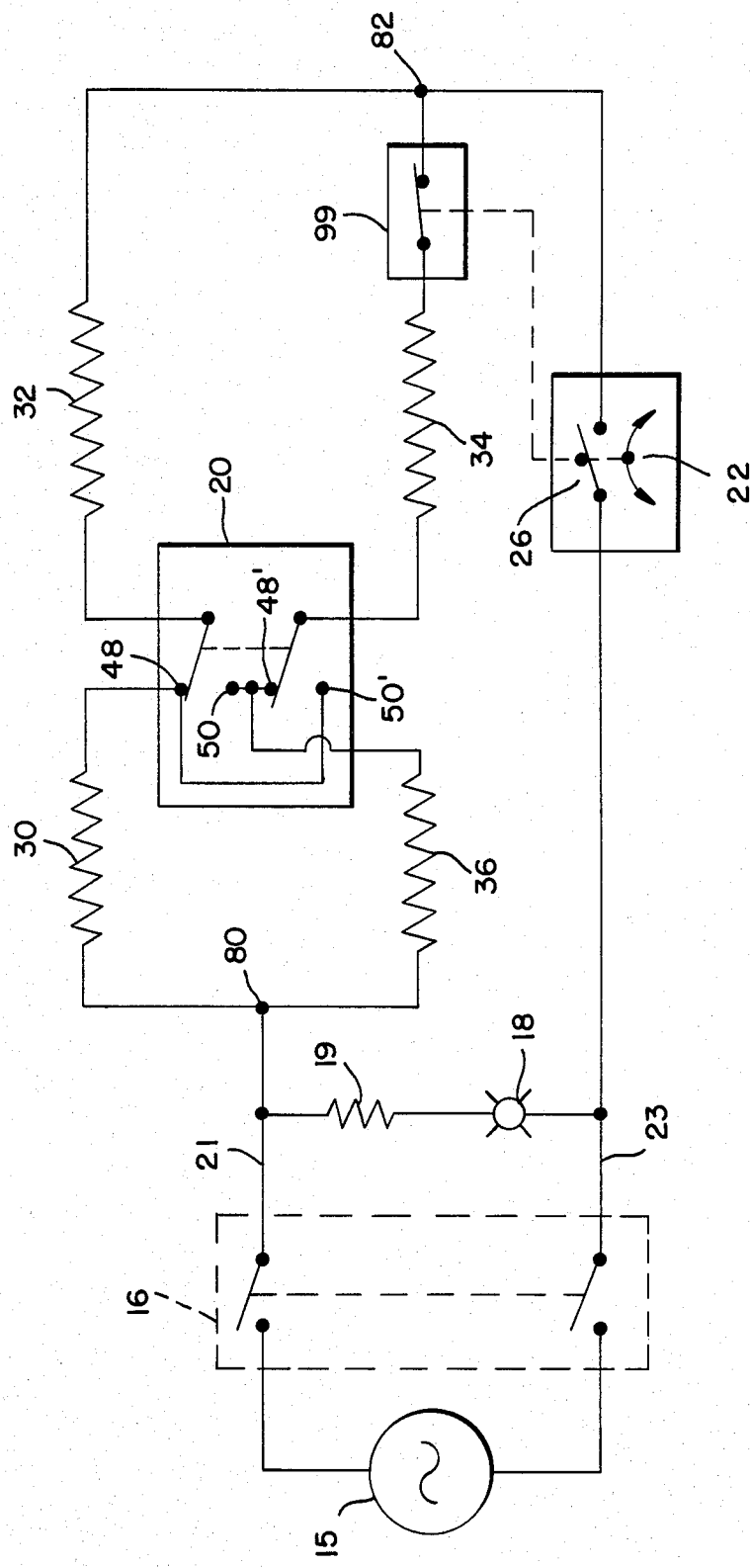
FIG. 2 is a simplified schematic circuit diagram of the electric toaster oven of FIG. 1.

FIG. 2 is a simplified circuit diagram of the toaster oven of FIG. 1, which illustrates the respective connections of the heating elements for obtaining different heating ratios. As shown, main switch 16 functions to energize the circuit by connecting it to a power source 15, e.g. a 120 volt AC source. Indicator light 18 is connected in series with a resistor 19 across power lines 21, 23 and indicates whether or not power is present. Switch 20, which is a double pole double throw switch in the preferred embodiment of the invention, moves between position 48, 48' (normal position) and position 50, 50' ("Gentle Bake" position). In the normal position, the circuit is established by the connection of line 21 to the series-connected upper heating elements 30 and 32 and, through the contacts of bimetallic thermostat 26, back to line 23 and to power source 15. In the normal position of switch 20, the series combination of elements 30, 32 is further connected in parallel to the series combination of lower heating elements 34 and 36, between node points 80 and 82. A switch 99, which is incorporated in rotary control 22, is connected between element 34 and node point 82. Switch 99 is opened to turn off the lower elements 34 and 36 when broiling. With the selected resistance values of 8 ohms and 12 ohms for the individual upper and lower heating elements respectively, 7.5 amperes of current will flow through the upper heating elements, while the current in the lower heating element will be 5 amperes. Thus, 900 watts and 600 watts of power will be dissipated by the upper and lower heating elements respectively, when switch 20 is in the normal position, to establish a heating ratio of 1.5. Further, a total of 1500 watts of power is available to generate heat in chamber 11 in the normal operating mode. Given the size of the chamber, the electrical resistance values of the Calrod elements and the distance between the food item and the upper and lower heating elements respectively, the heating ratio so established optimizes the baking process for the given conditions in the toaster oven. In essence, a heating ratio of 1.5 provides a balanced amount of heat from both the upper and lower heat sources, particularly for baking foods such as meats, casseroles and potatoes, as well as other items where excessive top browning is not a problem.

With a heating ratio of 1.5, the heat applied to the top surface of the food item is high, particularly if the item being baked is a thick cake or loaf of bread. This may result in an overly browned top crust by the time the interior is fully cooked. To reduce top crust browning, a lower heating ratio is required.

In accordance with the present invention, a lower heating ratio is provided by the circuit which is established when switch 20 is thrown to position 50, 50', i.e. the "Gentle Bake" position. In this mode of operation, line 21 is connected to the series combination which consists of upper heating element 30 and lower heating element 34, as well as to the series combination comprising upper heating element 32 and lower heating element 36. The latter two series combinations are connected in parallel between lines 21, 23, i.e. both are connected across the power source.

With the chosen resistance values of 8 ohms and 12 ohms for the upper and lower resistance elements, the resistance of each of the latter series combinations is seen to be 20 ohms and thus a 6 ampere current will flow through each series combination. Accordingly, 576 watts and 864 watts of power will be dissipated by the upper and lower heating elements respectively, thus providing a heating ratio of 0.66, and a total of 1440 watts is available to generate heat in the "Gentle Bake" mode. Thus, the total wattage of 1440 watts during "Gentle Bake" is substantially the same as 1500 watts during normal baking. Oven temperature is of course maintained by the thermostat 26 and baking time will not be adversely affected.

From the foregoing discussion, it will be clear that the present invention provides simple and inexpensive apparatus for implementing the variations of the ratio in which heat is applied to an object by a pair of heat sources positioned on opposite sides of the object, without substantially changing the total watts and thus the rate at which heat is applied to the object. As concerns a toaster oven, the present invention is capable of selectively varying the ratio according to which heat is applied from above and below to a food item in the oven chamber by electrically switching the individual heating elements to establish different circuits. This is achieved by adding only a minimal amount of equipment to a conventional toaster oven and without placing an undue load on the power line, or unbalancing the latter.

The present invention is not limited to the preferred embodiment illustrated and described. For example, the number of heating elements in each heat source is not limited to a pair. Further, in lieu of the double pole double throw switch shown, a switch having more than two positions may be used to connect the heating elements into a corresponding number of different circuits, where each circuit establishes a different heating ratio. Other embodiments within the scope of the invention will readily occur to workers in the art.

While a preferred embodiment of the invention is disclosed herein for purposes of explanation, numerous changes, modifications, variations, equivalents and substitutions, in whole or in part, will now be apparent to those skilled in the art to which the invention pertains. Accordingly, it is intended that the invention be limited only by the spirit and scope of the appended claims.

What is claimed is:

1. An electric toaster oven, comprising:
   a chamber adapted to hold at least one item of food in a predetermined position during the application of heat thereto;
   an upper heat source including a plurality of upper heating elements positioned in said chamber to heat said food item from above, the electrical resistance of each of said upper heating elements being substantially equal to each other;
   a lower heat source including a plurality of lower heating elements positioned in said chamber to heat said food items from below, the electrical resistance of each of said upper heating elements being substantially equal to each other;
   circuit energizing means; and switch means for selectively connecting
      said circuit energizing means to said heating elements to selectively establish a plurality of circuits, the electrical resistance of said upper heating elements being different from the electrical resistance of said lower heating elements so that each of said circuits selectively establish different heating ratios with respect to the heat applied to said food items by said upper and lower heat sources,
   the rated power output of said upper and lower heat sources being approximately 900 and 600 watts respectively for one heating ratio and approximately 580 and 860 watts respectively for another heating ratio.

2. An electric toaster oven, comprising:
   a chamber adapted to hold at least one item of food in a predetermined position during the application of heat thereto;
   an upper heat source including a plurality of upper heating elements
      positioned in said chamber to heat said food from above;
   a lower heat source including a plurality of lower heating elements
      positioned in said chamber to heat said food items from below, the electrical resistance of said upper heating elements being different from the electrical resistance of said lower heating elements;
   circuit energizing means;
   switch means adapted to selectively establish first and second circuits for providing first and second heating ratios respectively, said first heating ratio being greater than said second heating ratio to establish a different heating ratio with respect to the heat applied to said food item by said upper and lower heat sources; each of said circuits including first and second series combinations of said heating elements, said first and second series combinations being connected in parallel across said circuit energizing means;

said upper heat source comprising first and second heating elements and said lower heat source comprising third and fourth heating elements;

said first circuit including said first and second heating elements connected to form said first series combination and said third and fourth heating elements connected to form said second series combination; and said second circuit including said first and third heating elements connected to form said first series combination and said second and fourth heating elements connected to form said second series combination.

3. A toaster oven as recited in claim 2, wherein said first and second heating ratios have values of 1.5 and 0.66 respectively.

4. A toaster oven as recited in claim 2, wherein the rated power output of said upper and lower heat source is approximately 900 and 600 watts respectively for said first heating ratio and approximately 580 and 860 watts respectively for said second heating ratio.

5. An electric toaster oven for applying heat to a food item, comprising:
 a chamber;
 an upper heat source positioned in said chamber to heat said food item from above, said upper heat source including first and second heating elements;
 a lower heat source positioned in said chamber to heat said food item from below, said lower heat source including third and fourth heating elements;
 means in said chamber for supporting said food item;
 means for applying power to said heating elements;
 a switch for selectively connecting said heating elements to said power application means in a first and in a second circuit, each of said circuits comprising first and second pairs of heating elements connected in parallel across said power application means, individual ones of said pairs having the heating elements thereof connected in series;
 and said heating elements having electrical resistance values selected such that said first and second circuits provide heating ratios with respect to said food item which are greater and less than unity respectively, said resistance values being further selected such that said first and second circuits cause heat to be applied to said food item at substantially the same rate;
 said supporting means being positioned between said upper and lower heat sources but closer to said lower heat source;
 said first circuit including said first and second heating elements connected in series to form said first pair, and further including said third and fourth heating elements connected in series to form said second pair; and
 said second circuit including said first and third heating elements connected in series to form said first pair and further including said second and fourth heating elements connected in series to form said second pair.

6. Apparatus for varying the ratio of heat applied to an object by at least first and second heat sources positioned on opposite sides of said object;
 said first and second heat sources each including a plurality of heating elements;
 circuit energizing means; and switch means
 for connecting said circuit energizing means to said heating elements to establish a selected one of a plurality of different circuits;
 each of said circuits establishing a different heating ratio with respect to the heat applied to said object by said heat sources;
 said switch means being adapted to selectively establish first and second circuits for providing first or second heating ratios respectively, said first heating ratio being greater than said second heating ratio;
 each of said circuits including first and second series combinations of said heating elements connected in parallel across said circuit energizing means;
 said first heat source comprising first and second heating elements and said second heat source comprising third and fourth heating elements, the electrical resistance of each of said first heat source elements being greater than that of each of said second heat source elements;
 said first circuit including said first and second heating elements connected to form said first series combination and further including said third and fourth heating elements connected to form said second series combination; and
 said second circuit including said first and third heating elements connected to form said first series combination and further including said second and fourth heating elements connected to form said second series combination.

7. Apparatus as recited in claim 6 wherein said first and second heating ratios have values of 1.5 and 0.66 respectively.

* * * * *